United States Patent
Mori

(10) Patent No.: US 6,278,060 B1
(45) Date of Patent: Aug. 21, 2001

(54) MULTI-PART GROMMET

(75) Inventor: Keisuke Mori, Yokkaichi (JP)

(73) Assignee: Sumitomo Wiring Systems, Ltd., Yokkaichi (JP)

( * ) Notice: Subject to any disclaimer, the term of this patent is extended or adjusted under 35 U.S.C. 154(b) by 0 days.

(21) Appl. No.: 09/313,370

(22) Filed: May 18, 1999

(30) Foreign Application Priority Data

May 19, 1998 (JP) .................................................. 10-137269

(51) Int. Cl.[7] ...................................................... H02G 3/18
(52) U.S. Cl. .................. 174/65 G; 174/152 G; 174/153 G; 16/2.1
(58) Field of Search ............................... 174/31 R, 65 R, 174/65 SS, 65 G, 152 G, 153 G, 135, 95, 72 R; 16/2.1, 2.2; 248/56; 439/604

(56) References Cited

U.S. PATENT DOCUMENTS

| | | | |
|---|---|---|---|
| 2,933,550 | * 4/1960 | Cole et al. | 174/76 |
| 3,212,207 | * 10/1965 | Searing | 40/316 |
| 4,169,572 | * 10/1979 | Simon | 248/56 |
| 4,248,459 | * 2/1981 | Pato et al. | 285/319 |
| 4,997,994 | * 3/1991 | Andrews et al. | 174/112 |
| 5,227,585 | * 7/1993 | Zen | 174/95 |
| 5,448,017 | 9/1995 | Nakajima et al. | |
| 5,917,151 | * 6/1999 | O'Brien et al. | 174/72 A |
| 5,981,877 | * 11/1999 | Sakata et al. | 174/153 G |
| 6,015,952 | * 1/2000 | Mori | 174/72 R |
| 6,058,562 | * 5/2000 | Satou et al. | 16/2.1 |

FOREIGN PATENT DOCUMENTS

| | | |
|---|---|---|
| 0884221 | 12/1988 | (EP) . |
| 10164734 | 6/1998 | (JP) . |

* cited by examiner

Primary Examiner—Dean A. Reichard
Assistant Examiner—Dhiru R Patel
(74) Attorney, Agent, or Firm—Greenblum & Bernstein, P.L.C.

(57) ABSTRACT

A grommet is provided for linking a wire through a rear door glass from the roof of a vehicle, the rear door glass of the vehicle configured to open and close independently from the opening and closing of the rear door of the vehicle. The grommet has first through third flexible moldings and first and second rigid moldings. The flexible moldings allow the grommet to flex with the opening closing motion of the rear door and rear door glass, while the rigid moldings prevent the wire from deforming the grommet. The grommet is adapted to accept a wire through the third flexible molding and through the second rigid molding, through the second flexible molding, through the first rigid molding and through the first flexible molding. After passing the wire through all moldings, the moldings are adapted to be sequentially connected each other in substantially the same order as the wire passing order. Portions of the moldings have generally circular tubular configurations, while other portions of the moldings have generally flat tubular configurations in order to pass a group of wires through a narrow space. The grommet provides water-resistant protection for the wires contained therein.

7 Claims, 12 Drawing Sheets

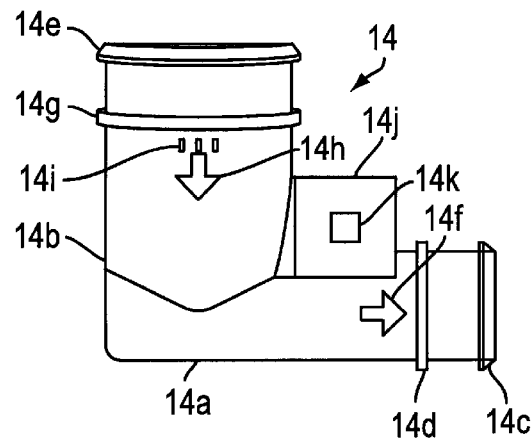
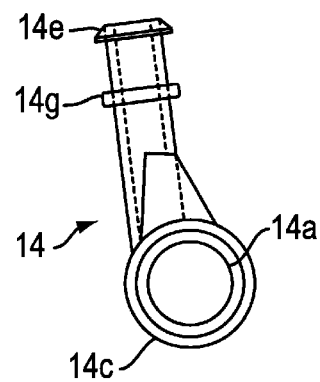
FIG. 4(A)  FIG. 4(B)
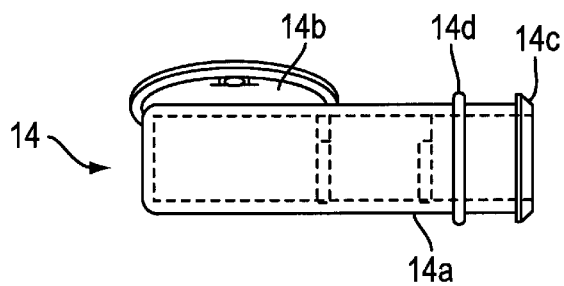
FIG. 4(C)
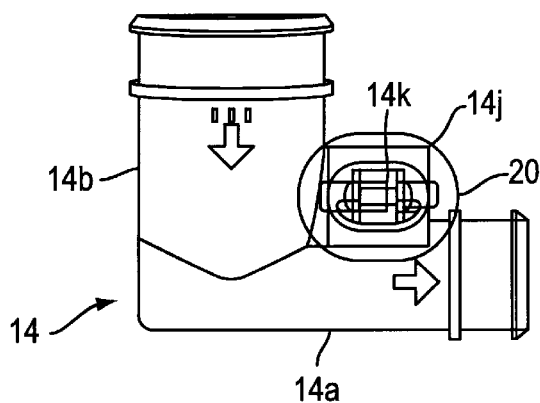
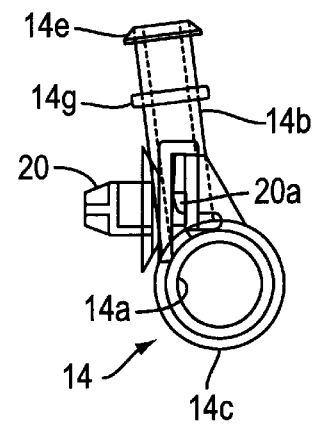
FIG. 4(D)  FIG. 4(E)

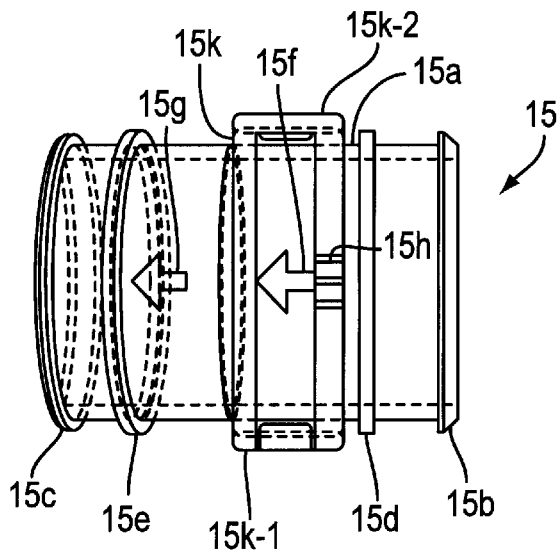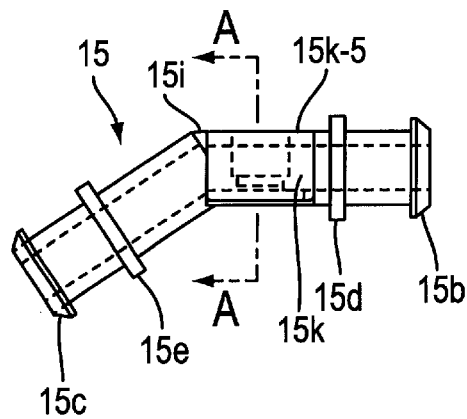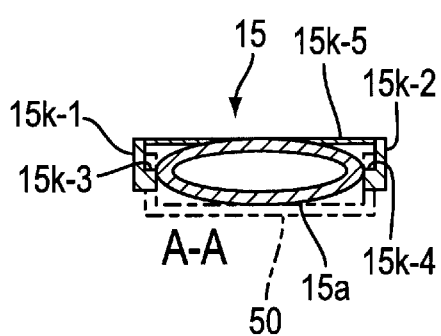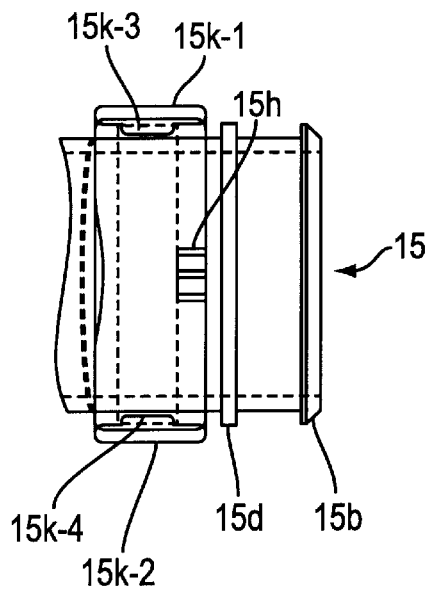
FIG. 6(A)
FIG. 6(B)
FIG. 6(C)
FIG. 6(D)

MULTI-PART GROMMET

BACKGROUND OF THE INVENTION

1. Field of the Invention

The present invention relates to a grommet for fastening to a hatchback-type car body, and more particularly, to a grommet providing for passage of wires therethrough, the grommet configured for installation between an automobile roof and a rear door glass panel of a hatchback-type automobile, in which the glass panel is opened and shut independently of the rear door.

2. Description of Background Information

Grommets providing for passage of wires are well-known in the related art. FIGS. 9 to 11 refer to such a related art grommet 5. The grommet 5 allows electric wiring to pass therethrough to a rear door of a hatchback-type automobile. The grommet 5 has cone-type diameter-expanding parts 5b and 5c on opposed ends of a small diameter tubular part 5a through which a group of electric wires is passed.

One diameter-expanding part 5b of the grommet 5 is affixed to a through-hole 1a formed at the edge of a roof panel 1 of a car body. The other diameter-expanding part 5c is affixed to a through-hole 3a formed by a hole in a rear door frame 3. A group of electric wires W is wired in a door from the through-hole 3a of the rear door frame 3 through the small diameter tubular part 5a of the grommet 5 and from the through-hole 1a of the roof panel 1, as shown in FIG. 11.

Hatchback-type automobiles having a glass panel in the rear door, where the glass panel may be opened and closed independently of the opening and closing of the entire rear door, have been recently introduced to the art. As shown in FIGS. 12 and 13, a rear door frame has a double structure in such a hatchback-type automobile, where a group of electric wires W is separately wired from a through-hole 1a of the roof panel 1 into both a through-hole 3a formed on the rear door frame 3 and a through-hole 40a formed on a frame 40 retaining a rear door glass panel 4.

In such a case, respective grommets 6A, 6B and 6C are respectively installed in the through-hole of a roof panel 1, in the though-hole 3a of rear door frame 3, and in the through-hole 40a of the glass retention frame 40, as shown in FIG. 13. However, water passing between electric wires of the group of electric wires W may enter into the roof or the inside of the rear door (inside of the frame), because the group of electric wires W is not covered with the grommet in the weather-exposed area between the rear door frame 3 and the glass retention frame 40. Therefore, a water-resistant agent such as a curing resin or the like is filled between electric wires of the group of electric wires W at the opening parts of the grommets 6A, 6B and 6C.

However, one problem with providing a water resistant agent is that construction is troublesome and high in cost. Additionally, the weather-exposed area is visible, and is thus unattractive because the group of electric wires W is in open view.

For the problems described above, the present inventor has previously provided the grommets 7 and 8 shown in FIGS. 14(A) and 14(B), which are described in Japanese Unexamined Patent Publication No. 9-150759. The grommet 7 shown in FIG. 14(A) is unitarily molded and has two tubular parts 7b and 7c that are perpendicular to an edge of tubular part 7a. For the grommet 8 shown in FIG. 14(B), tubular parts 8b and 8c are molded separately from tubular part 8a, and connected through joint tubes 8d and 8e to provide freedom of fastening and removal.

When the devices shown in FIGS. 14(A) and 14(B) are used, a group of electric wires in a water-exposed area may be kept water proof by being passed through the grommets 7 and 8. However, since both of the grommets 7 and 8 are molded with an flexible member comprising a rubber or an elastomer, the grommets 7 and 8 are deformed by the stiffness of the group of electric wires passed therethrough, at a position shown by dotted lines in FIG. 15. When such deformation occurs, there is a problem with maintaining water resistance, because the grommets contact other parts of the vehicle, thereby resulting in damages to the grommets.

As shown in FIG. 16, the electric wires often do not bend along with the contours of the grommets and the directions of the electric wires are uncontrolled even though electric wires are purportedly guided by bending the shape of the grommets, as the group of electric wires are stiff. Additionally, there is often only a flat space between the roof and rear door, thereby making wiring difficult, as wire groups are often too thick to pass therethrough.

Further, as the grommets 7 and 8 of FIGS. 14(A) and 14(B) are long in length, they are difficult to mold, and the passage of the group of electric wires is difficult. Particularly, there is a problem that molding is difficult. Also, insertion and passing a group of electric wires through the molded grommet cannot be easily carried out, since the grommet 7 has a plurality of bends.

SUMMARY OF THE INVENTION

The present invention is directed to solving the above-described problem. The present invention prevents water from penetrating a group of electric wires by dividing the wires into two or more groups, thereby controlling the mounting direction of the wires. Furthermore, the present invention is easily produced and passing wires therethrough is easily carried out.

The present invention provides a grommet through which a group of electric wires is passed for attachment to the inside of a car body. The grommet has tubular flexible material moldings composed of a rubber or an elastomer, and also has and tubular rigid resin moldings. These moldings accept a group of electric wires therethrough. The moldings are linked together by freely and removably connecting the end parts of the flexible material moldings with the edge parts of the rigid resin moldings. In alternative embodiments, however the flexible moldings may be made of other flexible materials, and the rigid resin moldings may be made from hard materials besides resin.

The grommet of the present invention may be either unitarily molded or separately molded and connected. The grommet has flexible material moldings molded from a rubber or an elastomer, and further has hard resin moldings molded from a relatively rigid synthetic or natural material, such as polypropylene or other synthetic material, alone or in combination. Since the rigid resin molding portions of the grommet control the bending directions of the wires, the bending directions of the wires are sufficiently controlled despite the stiffness of the wires.

Each molding of the present invention is short in length, resulting in ease of production. Additionally, the group of electric wires can be easily passed through these respective moldings prior to the connection of the moldings. The moldings may then be connected in sequence.

The parts of the flexible material moldings and rigid resin moldings are either flat tubular parts or round tubular parts. The end parts of these moldings are configured so that they may be mutually connected to each other. Hooking parts protrude on the outer peripheral surfaces of the tubular parts of the rigid resin moldings, and hooked parts are provided on the inner peripheral surface of tubular parts of the flexible material moldings. The hooked parts and hooking parts are hooked, connected and assembled together.

As discussed above, the wiring space between the roof of a vehicle to a rear door or hatch is a narrow flat area. The tubular shapes of both the flexible material moldings and the rigid resin moldings may be changed in accordance with the dimensions of the wiring space. The shapes may be partially flat or a circular tube, whereby the threading of the group of electric wires therethrough may be easily carried out.

Furthermore, since the hooked parts and the hooking parts are respectively provided on the ends of the respective flexible material moldings and rigid resin moldings, and are mutually connected, they are freely fastenable and removable and may be connected without compromising the water resistance of the invention.

It is particularly preferable that the hooking parts include a first hooking part obliquely protruding from the end of tubular part, and a second hooking part protruding at a predetermined distance from the first hooking part. Additionally, the hooked parts of the flexible material moldings include first hooked parts which are recessed at a predetermined distance from the end of the tubular parts, and further include second hooked parts which are recessed a predetermined distance from the first hooked parts. Additionally, sealing lips protrude from center intermediate the first hooked parts and second hooked parts.

The tubular parts of the rigid resin moldings interfit with the tubular parts of the flexible material moldings, the first hooking parts being pressed into the second hooked parts, the second hooking parts being pressed into the first hooked parts, and the sealing lips are pressed to be in contact with the outer peripheral surfaces of the other tubular parts to be connected.

Since the connection of the hooked parts with the hooking parts is redundant and sealing lips are further provided, water penetration through the connecting parts is thereby prevented. Furthermore, as the edges of the first hooked parts of the of the tubular parts interfit therewith are inclined, insertion and connection is facilitated.

Further, it is preferable to have marks indicating the insertion direction of electric wires, and to have marks indicating the connecting sequence of the moldings are provided on the outer peripheral surfaces thereof. The group of electric wires is passed through along the marks before the interconnection of the respective moldings, whereby the moldings may be interconnected after insertion and passing of the wires.

An arrow pattern of the above-mentioned marks may be molded in relief, and installation sequence indicator codes and the like may be molded in relief. Thus, electric wires can be passed through the separated moldings without error by marking the insertion direction of the electric wires (e.g., marks of connecting order), and these moldings can be accurately connected without mistaking their order of assembly. It is also preferable to pass the group of electric wires through the moldings before connecting the moldings together. However, in alternative embodiments, the moldings may be interconnected in advance and the group of electric wires may be passed thereafter.

Further, it is preferable to provide indicators on the outer peripheral surfaces of the connection edge parts of each molding, to aid in circumferential directional alignment. Elliptical section end parts may be interfit in the present invention, therefore assuring accurate circumferential alignment. For example, when installation directions do not coincide and are interfit 90 degrees off axis, water-resistance of the invention may not be maintained. Therefore, in accordance with the present invention, the circumferential alignment may be accurately accomplished.

The above-mentioned indicators for interfitting alignment, for example, may be provided in relief in the form of three lines parallel to the direction of insertion and passing of electric wires on both sides of the moldings which are to be interfitted, so that the edge of mark is positioned between both side lines.

In the grommet of the present invention, the first flexible material molding has a bellows-type tubular part that provides for continuous bending from a diameter-expanding tubular part. A resin inner is provided on the diameter-expanding tubular part, which is adapted to be intermitted in and connected with an installation location of a vehicle body. Further, the hooked part is provided on the inner peripheral surface of the opposite end of the above-mentioned bellows type tubular part. The second flexible material molding is of a flat tubular configuration and is provided with a hooked part on the inner peripheral surfaces of both ends of the second flexible material molding.

The third flexible material molding has a hooked part provided on the inner peripheral surface of one end thereof, the one end being of a flat tubular type. Another end of the third flexible material molding is split into a plurality of hatch hooking parts, each hatch hooking part having a branched tubular part depending therefrom.

A flat tubular part is provided on one end of the first rigid resin molding, and an almost circular tubular part is provided on the other end thereof. The hooking part of the one end of the first rigid resin molding is connected with the hooked part of one end of the second flexible material molding. One end of the second rigid resin molding is connected to the hooked part of other end of the second flexible material molding. After the group of electric wires is passed from the third flexible material molding to the second rigid resin molding, the second flexible material molding, the first rigid resin molding and the first flexible material molding, the hooking parts of the respective moldings are connected with the hooked parts. The grommet is adapted to insert and pass a group of electric wires to be wired from a roof to a rear door glass in a hatchback-type automobile car, in which the rear door glass is opened and shut, independently of the opening and shutting of the rear door of an automobile car.

A car body hooking part provided on the first flexible material molding is fastened by interfitting to a through-hole provided on a roof panel (the through-hole formed by cutting). Hatch hooking parts are also provided on the respective branched tubular parts of the third flexible material molding, and are respectively fastened by intermitting on the through-holes provided on rear hatch glass (the through-holes formed by cutting).

According to the one aspect of the invention, in a hatchback-type automobile in which the rear door glass is opened and shut independently of the opening and shutting motion of the rear door of an automobile, the group of electric wires may be wired from the automobile roof to the rear door glass of a rear door in a weather-exposed area, without getting wet. Further, since the bellows tubular part is provided on the first flexible material molding and the grommet deforms in accordance with the motion of opening and shutting the rear door and the motion of opening and shutting the rear door glass, deviation of the car body hooking part from the door frame of the rear door and the frame of retaining glass is thereby prevented.

According to one aspect of the invention, the grommet includes a flexible molding having a tube with an aperture for accepting at least one electric wire, as well as a substantially rigid molding (meaning that the molding can be rigid or almost rigid, hereinafter described as rigid) having a tube having an aperture for accepting the at least one electric wire. The rigid resin molding is movably connected to the flexible molding, and the rigid molding aperture is in communication with the flexible molding aperture. The rigid molding further has a bent portion.

According to another aspect of the invention, the grommet may further include at least one hooking part provided on an outer peripheral portion of an end of the tube of the rigid molding, and may also include at least one hooked part provided on an inner peripheral portion of an end the tube of the flexible molding, wherein the at least one hooked part and the at least one hooking part are configured to be sequentially connected to one another. Further, at least a portion of the flexible molding and at least a portion of the rigid resin molding may include a flat tubular portion, and at least a portion of the flexible molding and at least a portion of the rigid resin molding may include a circular tubular portion.

Additionally, according to still another aspect of the invention, a first hooking part may protrude at an incline from a tip of the end of the tube of the rigid molding, and a second hooking part is located at a predetermined distance from the first hooking part. The hooked part may include a first hooked part recessed at a predetermined distance from a tip of the end of the tube of the flexible molding, and a second hooked part recessed at a predetermined distance from the first hooked part, and may further include a sealing lip centrally protruding the first hooked part and the second hooked part. The tube of the rigid molding may internally interfit with the tube of the flexible molding, the first hooking part may interfit with the second hooked part, the second hooking part may interfit with the first hooked part, and the sealing lip may interfit intermediate the first and the second hooking parts.

According to still another aspect of the invention, the grommet may further include a first mark provided on the outer periphery of each the tube of the flexible molding and the rigid molding. The mark may indicate an insertion direction for inserting the at least one wires in the grommet, and may further indicate an order of assembly, thereby enabling the at least one wires to be inserted in accordance with the mark prior to the connection of the flexible molding and the rigid molding, and further enabling the connection of the at least one wire after insertion thereof.

According to yet another aspect of the invention, the grommet may further include a second mark located at an outer peripheral surface proximate the connection intersection of the flexible molding and the rigid molding, the second mark configured to aid in the circumferential directional alignment of the flexible molding with the rigid molding.

Furthermore, according to still yet another aspect of the invention, the flexible molding of the grommet may include a first flexible molding having a diameter-expanding tubular part located at the first end thereof with a bellows-type tubular part being continuously bent from the diameter-expanding tubular part to the second end thereof.

Additionally, a resin inner member having a car body hooking part on the diameterexpanding tubular part may be provided, wherein a hooked part is provided on an inner peripheral surface of the second end of the first flexible molding. Also included may be a second flexible molding having a flat tubular configuration, wherein hooked parts are provided on the inner peripheral surface of each end thereof. Also provided is a third flexible molding wherein one end has a hooked part provided on the inner peripheral surface thereof and a flat tubular cross-section, and another the end may be split into a plurality of hatch hooking parts. Each hatch hooking part may have a branched tubular part depending therefrom, and each branched tubular part may have a pair of longitudinal slits therein.

The rigid molding of the grommet may include a first rigid molding having a hooking part provided on an outer peripheral surface of one end thereof, which may have a circular tubular portion. A first hooking part may be provided on an outer peripheral surface of one end of the first rigid molding, which may be adapted to be connected to the hooked part of the first flexible molding. The ends of the first rigid molding may be at approximately a right angle. Another end of the first rigid molding includes a flat tubular portion depending from the circular tubular portion. A second hooking part may be provided on an outer peripheral surface of the one end of the first rigid molding, the second hooking part adapted to be connected to the second hooked part of the end of the second flexible molding. Also, a second rigid molding may be provided, which has opposed ends and is bent along its width at a midpoint of its longitudinal direction and further has a generally flat tubular cross section, and still further has a third hooking part provided on an outer peripheral surface of one end of the second rigid molding. The third hooking part may be adapted to be connected with the third hooked part on the second flexible molding, and a fourth hooking part may be provided on an outer peripheral surface of another end of the second rigid molding, and adapted to be connected with the fourth hooked part on the third flexible molding. After the insertion of a wire through the respective moldings, the hooking parts are adapted to be sequentially connected with the hooked parts.

According to a further aspect of the invention, the grommet may further include a car body hooking part provided on the first flexible molding and adapted to be connected to a through-hole provided on a roof panel of a vehicle, and a hatch hooking part provided a branched tubular part of the third flexible molding and adapted to be connected to a through-hole provided on rear door glass of the vehicle.

BRIEF DESCRIPTION OF THE DRAWINGS

The present invention is further described in the detailed description which follows, in reference to the noted plurality of drawings by way of non-limiting examples of certain embodiments of the present invention, in which like numerals represent like elements throughout the several views of the drawings, and wherein:

FIG. 4(A) is a plan view of the first rigid resin molding of the present invention.

FIG. 4(B) is a right side elevational view of the first rigid resin molding of the present invention.

FIG. 4(C) is a front view of the first rigid resin molding of the present invention.

FIG. 4(D) is a plan view of the first rigid resin molding of the present invention, showing a clip attached thereto.

FIG. 4(E) is a right side elevational view of the first rigid resin molding of the present invention showing a clip attached thereto.

FIG. 6(A) is a plan view of the second rigid resin molding of the present invention.

FIG. 6(B) is a front view of the second rigid resin molding of the present invention.

FIG. 6(C) is a sectional view cut along line A-A of FIG. 6(B) of the second rigid resin molding of the present invention.

FIG. 6(D) is a partial bottom view of the second rigid resin molding of the present invention.

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figure 1:
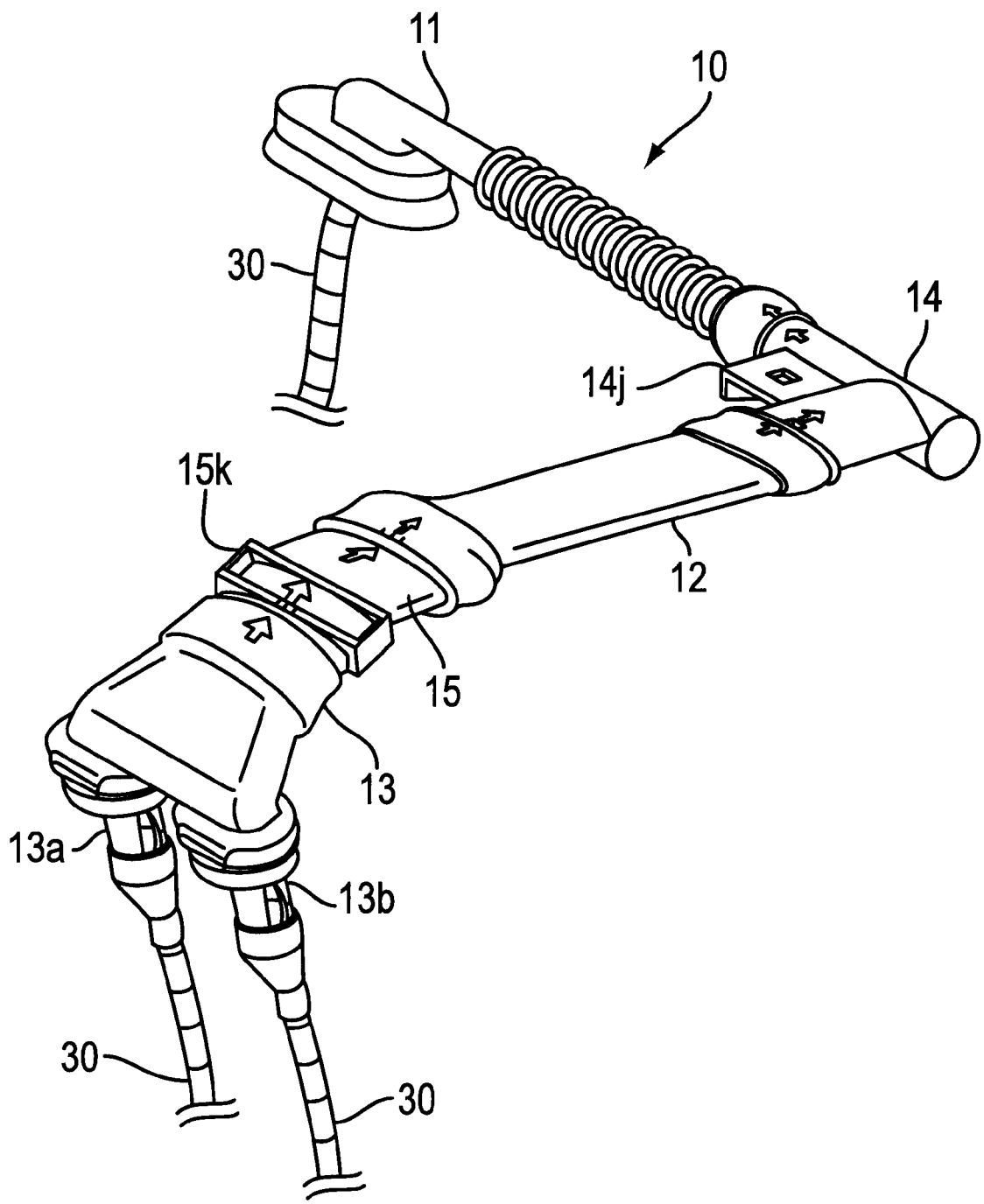
FIG. 1 is a perspective view showing the grommet of the present invention.

Referring to the drawings wherein like numerals represent like elements, FIG. 1 shows a grommet 10 which includes a first flexible material molding 11, a second flexible material molding 12 and a third flexible material molding 13 which are constructed of any suitable flexible or elastomeric material as a rubber or a synthetic elastomer. Also provided is a first rigid resin molding 14 and a second rigid resin molding 15 which are preferably constructed of any suitable relatively rigid resin material, such as polypropylene. Any of these moldings may have a tubular shape. The grommet 10 is assembled by sequentially connecting the first flexible material molding 11, the first rigid resin molding 14, the second flexible material molding 12, the second rigid resin molding 15 and the third flexible material molding 13, such that the grommet 10 forms a path for inserting and passing the group of electric wires 30.

Figure 2A:
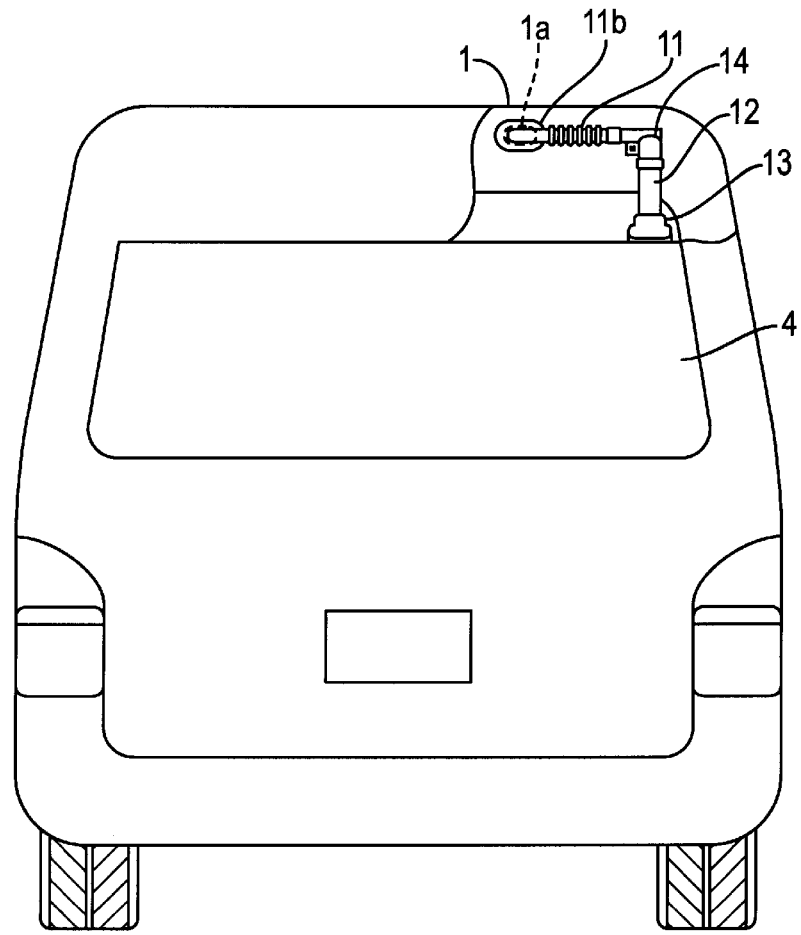
FIG. 2(A) is a rear view of a hatchback-type automobile with a portion broken away to show the grommet of the present invention installed therein.
Figure 2B:
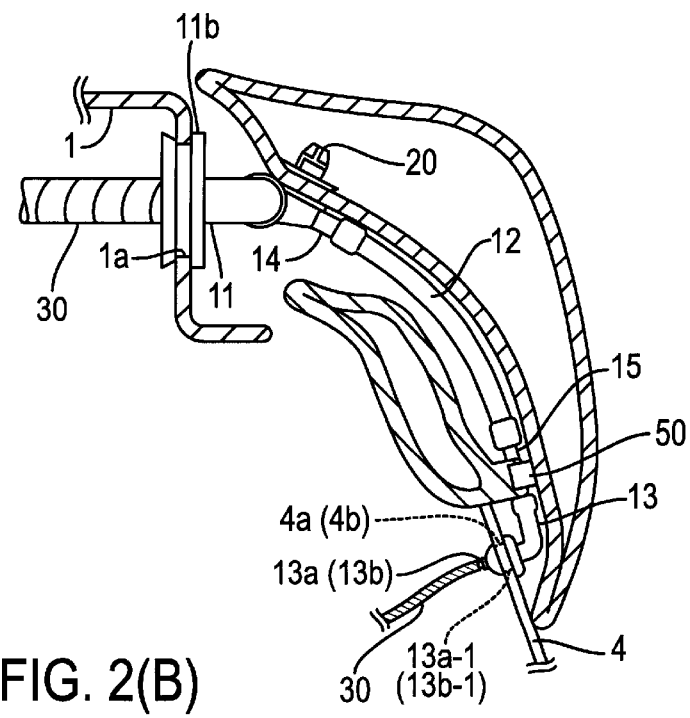
FIG. 2(B) is a side cross-sectional view of a rear end of a hatchback-type automobile showing the grommet of the present invention installed therein.
Figure 3A:
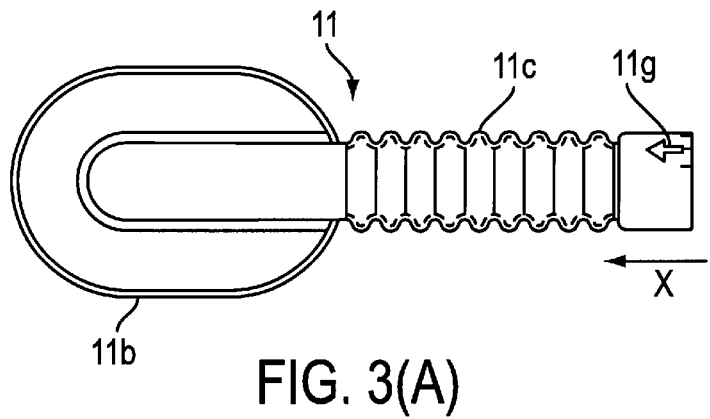
FIG. 3(A) is a top plan view of the first flexible material molding of the present invention.
Figure 3B:
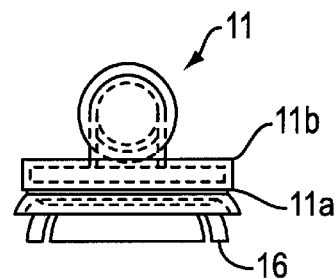
FIG. 3(B) is a left side elevational view of the first flexible material molding of the present invention.
Figure 3C:
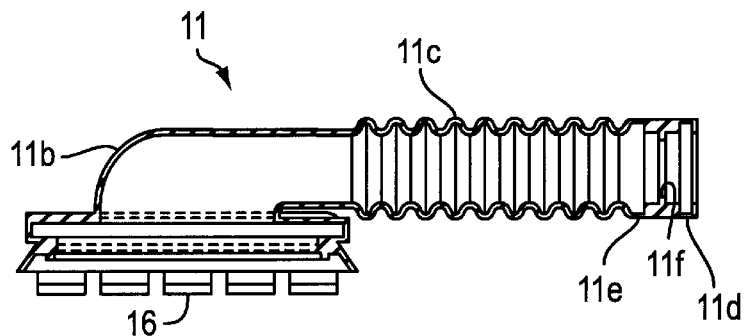
FIG. 3(C) is a cross-sectional view of the first flexible material molding of the present invention.
Figure 3D:
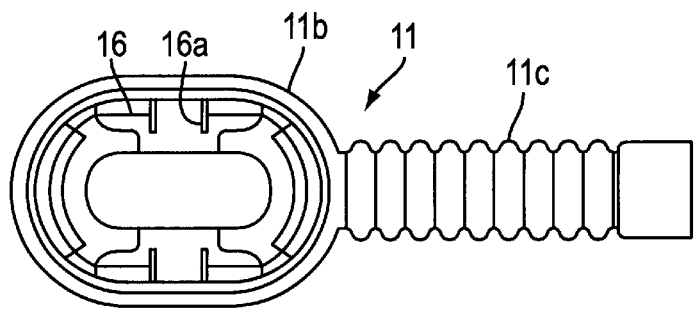
FIG. 3(D) is a bottom plan view of the first flexible material molding of the present invention.
Figure 7A:
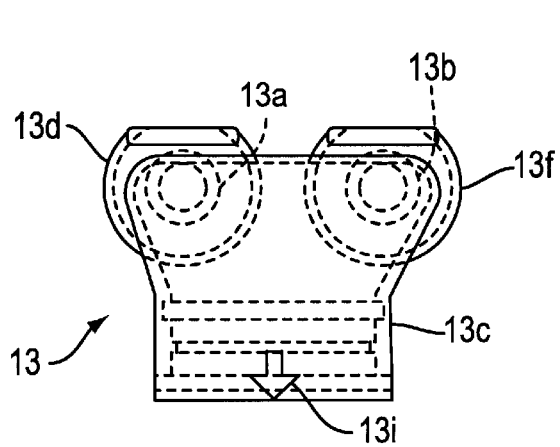
FIG. 7(A) is a plan view of the third flexible material molding of the present invention.

The grommet 10 is provided with a group of electric wires wired to a rear door glass which is opened and shut, independently of the opening and shutting of a rear door from a roof panel 1. As shown in FIGS. 3(B) through (D), a car body hooking part 16a of a resin inner member 16 is interfitted with the first flexible material molding 11 at one end of the grommet 10. As shown in FIGS. 2(A) and 2(B), the resin inner member is then fastened in the through-hole 1a which is provided on the roof panel 1, where the group of electric wires is installed therein, thereby connecting one end of the grommet to the car body. Further, hatch hooking parts 13a-1 and 13b-1 (note FIGS. 7(B) and 7(C)) are respectively provided on respective branched tubular parts 13a and 13b of the third flexible material molding 13 and are fastened in through-holes 4a and 4b of a rear door glass 4 to be installed (FIG. 2(B)), thereby connecting the other end of the grommet to the door glass.

FIGS. 3(A), 3(B), 3(C) and 3(D) show the first flexible material molding 11. The resin inner 16 interfits with the inside of an elliptically-shaped diameter-expanding tubular part 11b, and the car body hooking part 16a is provided at the resin inner 16. The generally circular-shaped bellows tubular part 11c extends perpendicularly from the opening of the diameter-expanding tubular part 11b. A first hooked part 11d which is positioned a predetermined distance from the edge of the first flexible material molding 11, is recessed in the inner peripheral surface of a connection side end of the tubular part 11c. The second hooked part 11e is recessed at a predetermined distance from the first hooked part 11d, and a sealing lip 11f protrudes intermediate the first hooked part 11d and second hooked part 11e, as shown in FIG. 3(c). Further, an arrow mark (i.e., first mark) 11g in the X direction is molded in relief on the outer peripheral surface of the connection side end of the tubular part 11c, to indicate the insertion direction of wires.

The first rigid resin molding 14 has a generally L-shaped configuration and is bent by 90 degrees at a middle part, as shown in FIGS. 4(A)–4(E). One end has a flat tubular part 14b, and the other side has a near circular shape tubular part 14a. The other end of the tubular part 14a has an opening, and a first hooking part 14c that is configured to be connected with the first flexible material molding 11 obliquely protrudes from the outer peripheral rim of the opening. The other end 14a also has a second hooking part 14d that protrudes a predetermined distance from the first hooking part 14c. The other end of the tubular part 14a has a closed plane, and the flat shaped tubular part 14b is linked to a peripheral wall adjacent to the closed plane. A first hooking part 14e of the tubular part 14b is configured to be connected to the second flexible material molding 12, and obliquely protrudes at the outer peripheral rim of the opening of the tubular part 14b. Additionally, the tubular part 14b further has a second hooking part 14g that protrudes a predetermined distance from the first hooking part 14e.

An arrow 14f is located near the second hooking part 14d on the outer peripheral surface of the tubular part 14a, and an arrow mark 14h is also located near the second hooking part 14g on the outer peripheral surface of the tubular part 14a. Further, three lines 14i (collectively referred to as the second mark) for circumferential directional alignment are provided in parallel near the arrow mark 14h.

Further, a clip installation piece 14j protrudes on the inner side of the 90 degree intersection of the tubular part 14b and the near circular part 14b. An installation hole 14k for fastening a clip 20 is concavely provided at the center of the clip installation piece 14j. The clip 20 is for connecting the grommet 10 to a car body and is provided on the clip installation piece 14j. A fastening part 20a is provided on the clip 20 and is inserted into the installation hole 14k. The clip 20 is designed to allow the grommet 10 to be easily fastened and removed from a car body.

Figure 5A:
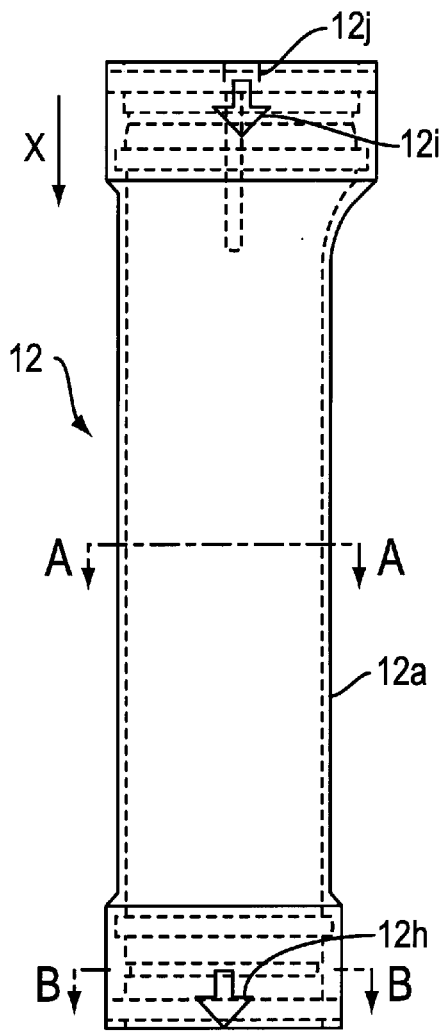
FIG. 5(A) is a plan view of the second flexible material molding of the present invention.
Figure 5B:
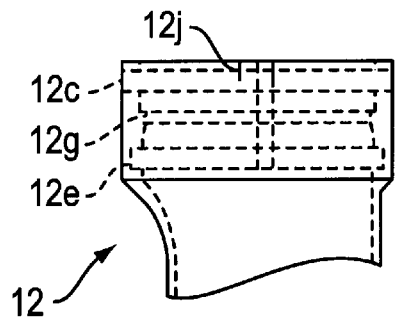
FIG. 5(B) is a bottom view of a portion of the second flexible material molding of the present invention.
Figure 5C:
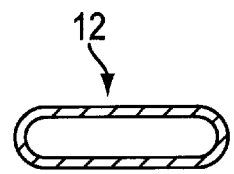
FIG. 5(C) is a sectional view cut along line A—A of FIG. 5(A) of the second flexible material molding of the present invention.
Figure 5D:
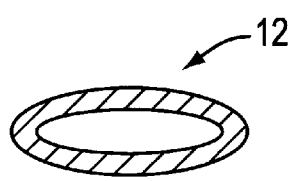
FIG. 5(D) is a sectional view cut along line B—B of FIG. 5(A) of the second flexible material molding of the present invention.
Figure 5E:
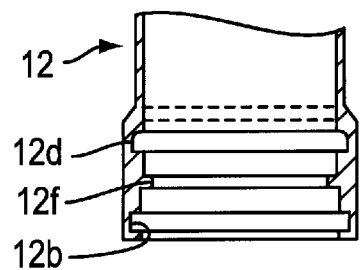
FIG. 5(E) is a sectional view showing a hooked part provided on the end part of the second flexible material molding of the present invention.

The second flexible material molding 12 has a flat tubular shape in the form of a tubular part 12a, shown in FIGS. 5(A)–(E). The second flexible material molding 12 has two openings, both of which are elliptical in shape. The second flexible material molding 12 further has a middle part that is generally rectangular in cross section, as shown in FIG. 5(C). A hooked part is provided on the inner peripheral surface of one end of a tubular part 12a, and is configured for connection to the first rigid resin molding 14. A hooked part is also provided on the inner peripheral surface of the other end of the tubular part and is configured for connection to the second rigid resin molding 15.

First hooked parts 12b and 12c are recessed at a position a predetermined distance from a respective end of the tubular part, similar in arrangement to the hooked part provided on the first flexible material molding 11. Second hooked parts 12d and 12e are respectively recessed at a predetermined distance from respective first hooked parts 12b and 12c. A sealing lip 12f protrudes from the center between first hooked part 12b and second hooked part 12d, and similarly, a sealing lip 12g protrudes from the center between first hooked part 12c and second hooked part 12e.

An arrow mark 12h, shown pointed in the X direction, is provided on the outer peripheral surface of one connection end of the tubular part 12a, to aid in the connection of the first connection end with the first rigid resin molding 14. An arrow mark 12i, also shown pointed in the X direction, is provided on the outer peripheral surface of another connection end of the tubular part 12a, to aid in the connection of the other connection end with the second rigid resin molding 15. Three lines 12j are also provided near the other end for circumferential directional alignment.

The second rigid resin molding 15 is shown in FIGS. 6(A)–6(D) and has a generally flat tubular shape. At a middle part, the second rigid resin molding 15 is longitudinally bent at a moderate angle (about 150 degrees) as shown in FIG. 6(B). The bend corresponds to the wiring space within the molding 15.

One end opening of the flat tubular part 15a is configured to be connected with the other end of the second flexible material molding 12, and another end opening is configured to be connected with the third flexible material molding 13. First hooking parts 15b and 15c are inclined and protrude from the peripheral rims of a respective tubular part opening, and respective second hooking parts 15d and 15e each protrude at a predetermined distance from respective first hooking parts 15b and 15c. Further, arrow marks 15f and 15g and three lines 15h are provided on the outer peripheral surface of the tubular part 15a, for circumferential directional alignment of the second rigid resin molding 15.

Further, a frame part 15k having a parallelepiped-shape protrudes outwardly from the tubular part 15a at a position which is adjacent to the bend region 15i of the tubular part 15a, shown in FIG. 6(B). Hooking pieces 15k-3 and 15k-4 are provided on side parts 15k-1 and 15k-2 thereof. Hooking pieces 15k-3 and 15k-4 are hooked on a bracket 50, which is provided on the rear door glass 4 of the vehicle, and is used for fastening the grommet 10 to the rear door glass. The connecting part 15k-5 of the frame part 15k horizontally maintains the grommet by connecting to the central part of the elliptically-shaped tubular part 15a. The connecting part 15k-5 keeps the grommet 10 stable by contacting the horizontal connecting part 15k-5 on the car body surface, and also protects the tubular part 15a.

The third flexible material molding 13 is shown in FIGS. 7(A)–7(D), and has a flat tubular part 13c on one end adapted to be connected to the second rigid resin molding 15.

Figure 7C:
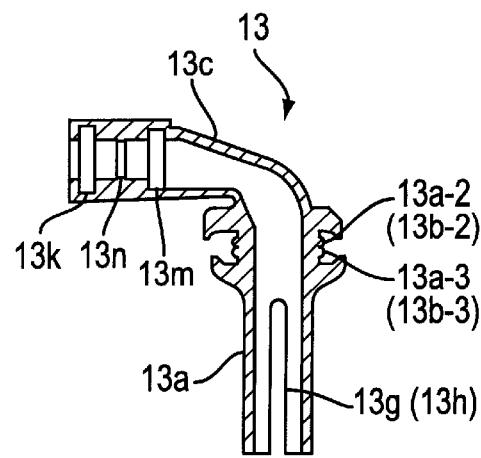
FIG. 7(C) is a sectional view cut along line B-B of FIG. 7(B) of the of the third flexible material molding of the present invention.
Figure 7B:
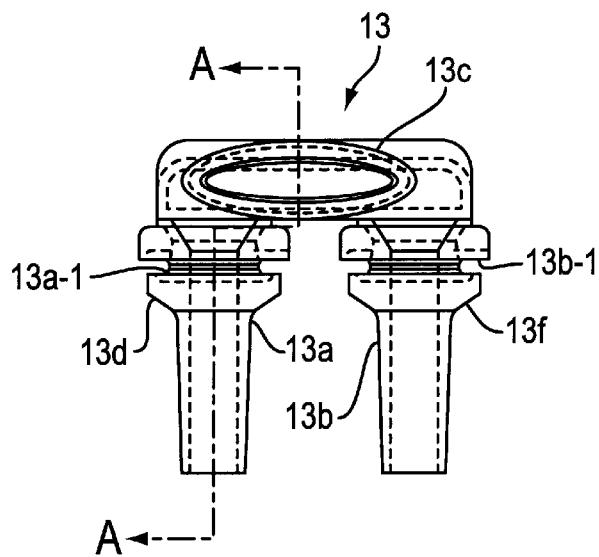
FIG. 7(B) is a front elevational view of the third flexible material molding of the present invention.
Figure 7D:
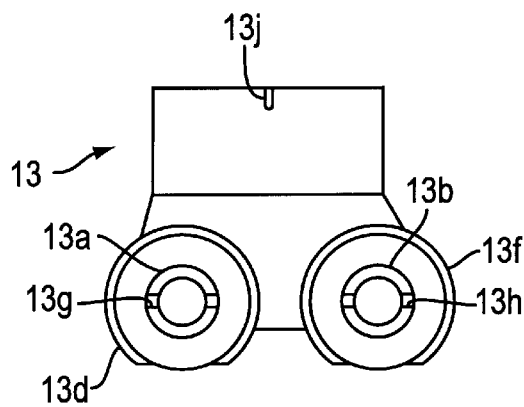
FIG. 7(D) is a bottom plan elevational view of the third flexible material molding of the present invention.

The opposite end is split into two branched tubular parts 13a and 13b, which branch from the tubular part 13c. Sword-guard parts 13d and 13f depend from hatch hooking parts 13a-1 and 13b-1, which in turn depend from the outer peripheral surface of respective base sides of branched tubular parts 13a and 13b. The hatch hooking parts 13a-1 and 13b-1 each have a pair of sealing lips 13a-2, 13a-3, 13b-2 and 13b-3, respectively, as shown in FIG. 7(C), thereby enhancing the sealing properties of the grommet. Further, slits 13g and 13h facilitate the insertion of electric wires into the distal portions thereof, the wires being further guided into the branched tubular parts 13a and 13b, which have a diameter smaller at their proximal ends.

Further, a first hooked part 13k and a second hooked part 13m are recessed within tubular part 13c for connecting the tubular part 13c to the second rigid resin is molding 15, and a sealing lip 13n is provided between the first hooked part 13k and the second hooked part 13m. As seen in FIG. 7(A), an arrow mark 13i that indicates both the insertion direction of electric wires and the assembly direction is provided on the outer peripheral surface of the third flexible material molding 13. Three lines 13j for circumferential directional alignment are also provided.

Before the first, second and third flexible material moldings 11, 12 and 13, and the first and second rigid resin moldings 14 and 15 are assembled, as shown in FIG. 1, electric wires are preferably inserted through the moldings 11–15 in the following order: through the third flexible material molding 13, through the second rigid resin molding 15, through the second flexible material molding 12, through the first rigid resin molding 14, and through the first flexible material molding 11. The marks are provided on the respective moldings in order to ensure the proper insertion direction of the electric wires 30. Although the branched tubular parts 13a and 13b of the third flexible material molding 13 at the point of insertion of the electric wires are small in diameter, the electric wires are easily inserted because slits 13g, 13h are provided. After the insertion, the branched tubular parts 13a and 13b and the electric wires 30 are preferably wrapped with tape.

Figure 8A:
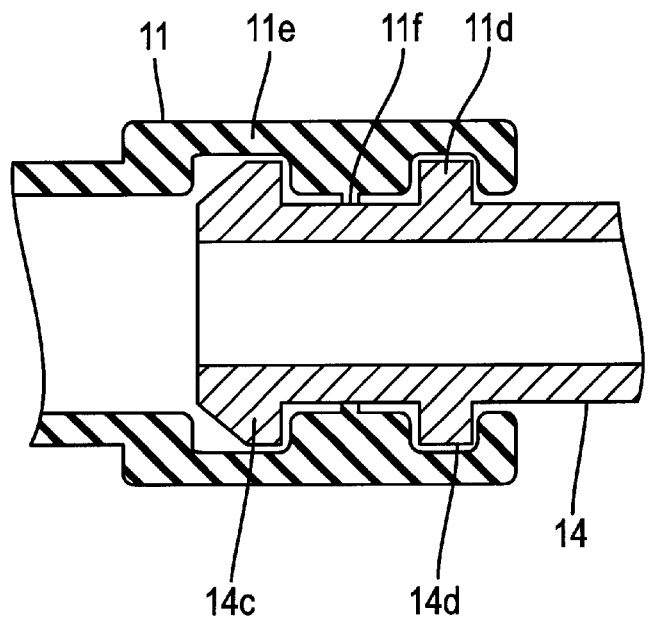
FIG. 8(A) is a sectional view of the present invention showing a hooking part connected with a hooked part.
Figure 8B:
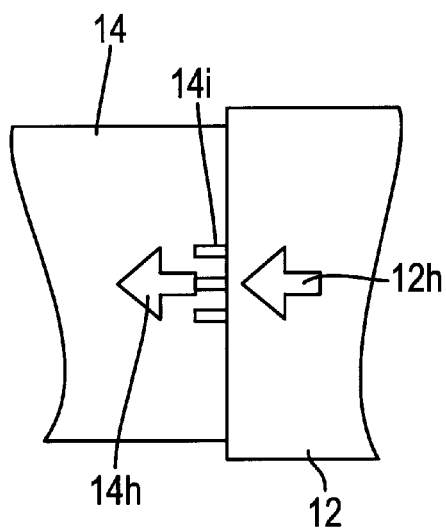
FIG. 8(B) is a plan view of the present invention showing a hooking part connected with a hooked part.
Figure 9:
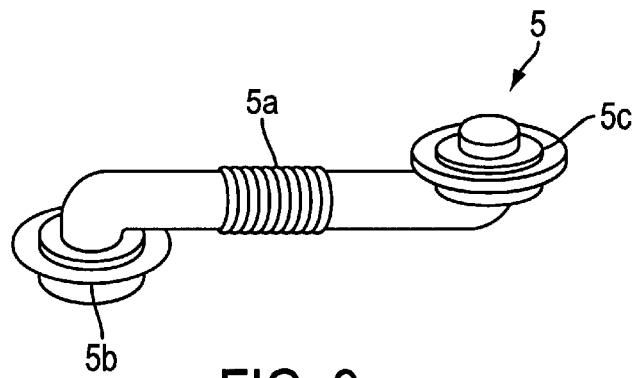
FIG. 9 is a perspective view of a related art grommet.
Figure 10:
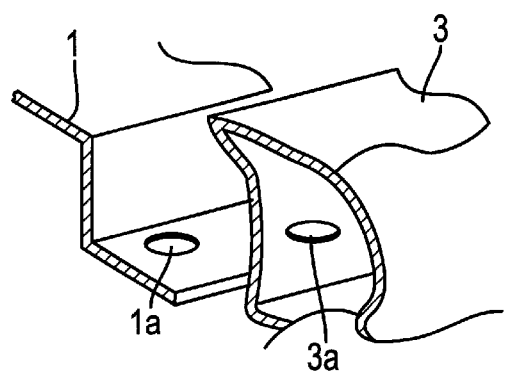
FIG. 10 is a perspective view showing the installation location of the related art grommet of FIG. 9.
Figure 11:
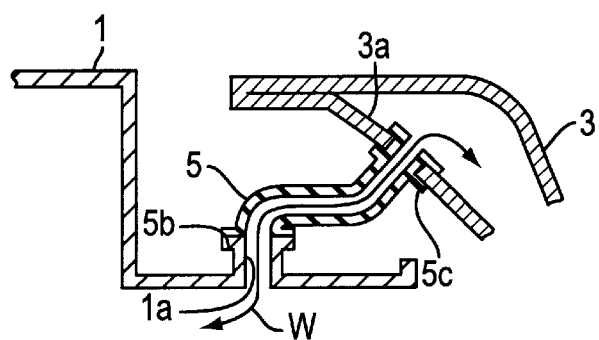
FIG. 11 is a sectional view of the related art grommet of FIG. 9 installed in the installation location of FIG. 10.
Figure 12:
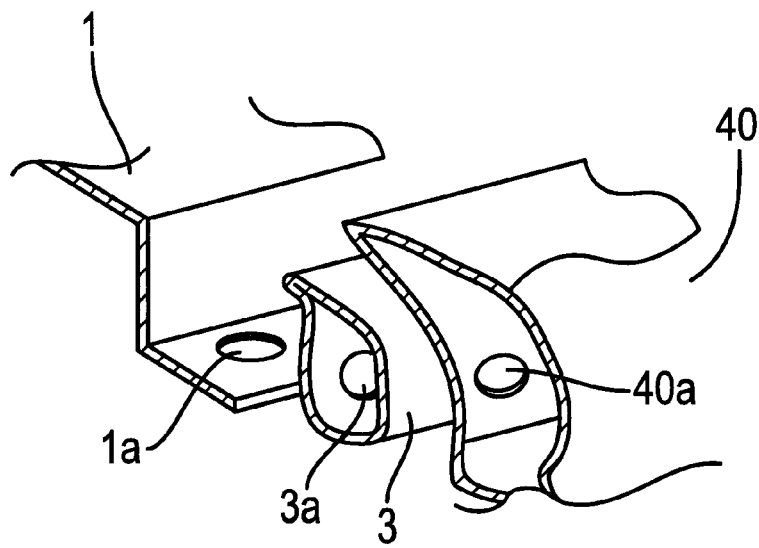
FIG. 12 is a perspective view of an installation location of a second related art grommet.
Figure 13:
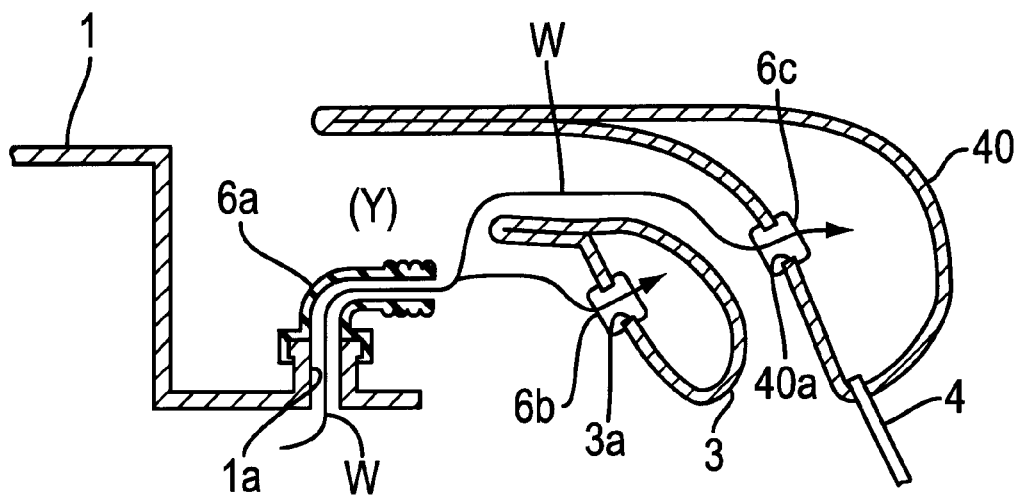
FIG. 13 is a sectional view of the second related art grommet installed in the installation location of FIG. 12.
Figure 14A:
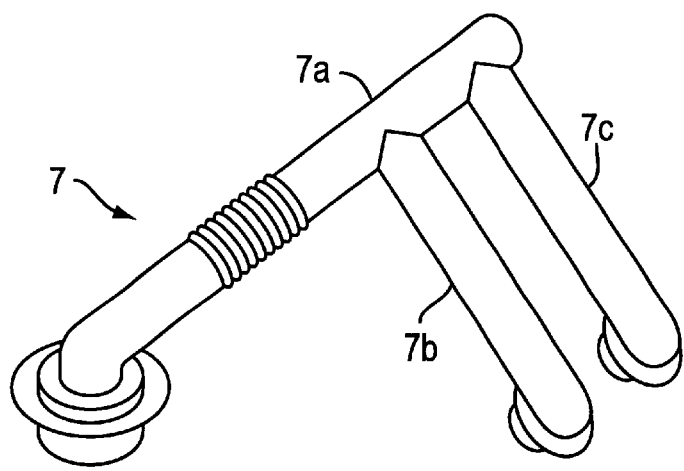
FIG. 14(A) is a perspective view showing a third related art grommet.
Figure 14B:
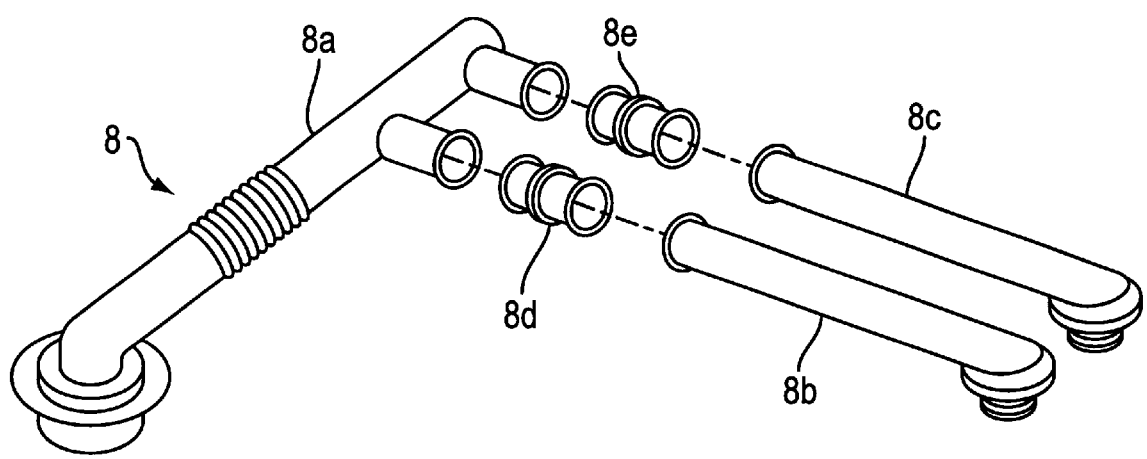
FIG. 14(B) is a perspective view showing a fourth related art grommet.
Figure 15:
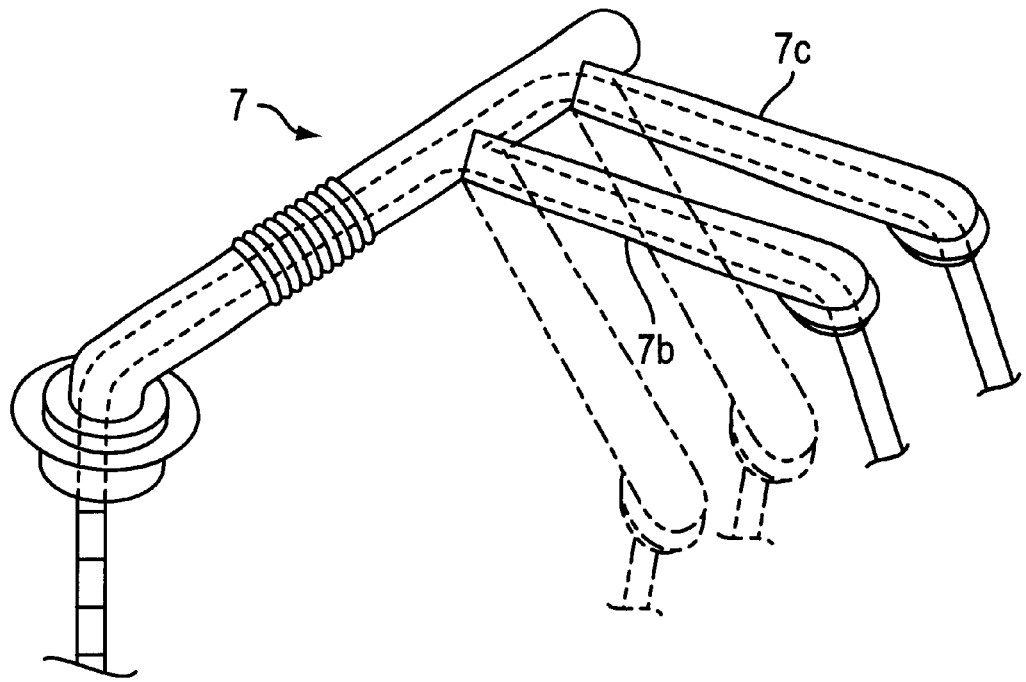
FIG. 15 is a perspective view showing the problematic bending of the third related art grommet.
Figure 16:
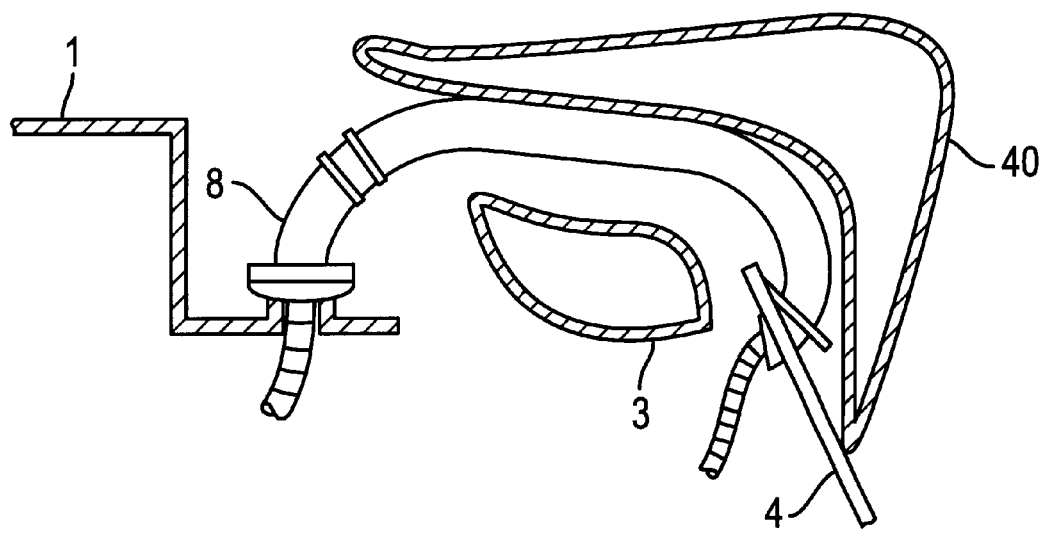
FIG. 16 is a sectional view showing the problematic bending of the fourth related art grommet.

After the electric wires 30 are passed through the moldings 11–15, they are preferably connected in the following order: the third flexible material molding 13, the second rigid resin molding 15, the second flexible material molding 12, the first rigid resin molding 14, and the first flexible material molding 11, which is the same as the insertion order of the electric wires. The ends of the rigid resin moldings 14 and 15 may be pressed into the end openings of the flexible material moldings 11, 12 and 13. When pressing the moldings 11–15, the connecting parts are interfit as shown in FIG. 8(A) and 8(B) so that the arrow tip aligns with the center line of the three lines for circumferential directional alignment, which is provided on the respective connecting parts. The circumferential directional alignment is carried out so that the arrow end comes at least between the lines of both sides. The first hooking part is connected with the second hooked part and the second hooking part is connected with the first hooked part respectively while positioning, and the sealing lips that protrude from inner peripheral surfaces of flexible material moldings are pressed in contact with the outer peripheral surfaces of the rigid resin moldings.

Thus, after the electric wires are passed through the respective moldings in sequence (which include 5 pieces), the moldings are connected, and therefore the insertion work of the electric wires 30 can be easily performed, and the connection of these moldings can also be easily performed.

As shown in FIG. 2, the grommet 10 is installed between the roof panel 1 of automobile and the rear door glass 4 of rear door, whereby the grommet 10 is provided with electric wires 30, as described above. Moreover, the clip 20 provided on the rigid resin molding 14 is fastened to the frame of the main body of the vehicle. The hooking pieces 15k-3 and 15k-4 of the frame part 15k provided on the second rigid resin molding 15 are hooked on the bracket 40 positioned on the rear door glass 4. Since the grommet 10 is fastened via the through-holes of the roof panel 1 and the rear door glass 4, and is further fastened with the clip 20 and the hooking pieces 15k-3 and 15k-4, the grommet 10 can be stably retained.

The wires pass through the first rigid resin molding 14 and are bent by 90 degrees. These wires are assuredly bent by 90 degrees by the first rigid resin molding 14 against the straight biasing stiffness of the group of electric wires 30. Therefore the group of electric wires 30 can be controlled without deviating from a fastened wiring diagram. Further, the vehicle area has a narrow space for electric wires. This space is passed by the second rigid resin molding 15 which has a flat elliptic tubular shape. Thus, the group of electric wires 30 can be maintained in a flat position.

The present invention is not limited to the above-described mode of operation, and flexible material moldings having a rubber or an elastomer, and rigid resin moldings which are divided in the direction of inserting and passing electric wires, are formed and made as respective flexible material moldings and the rigid resin moldings in accordance with respective positions of the grommet. These moldings are assembled as shown in the above illustrations. The grommet related to the present invention is a construction wherein a grommet has been made of a rubber or an elastomer is divided at requisite positions in the direction of inserting and passing electric wires. The divided parts are formed by flexible material moldings including a rubber or an elastomer, and rigid resin moldings. These moldings are connected in sequence. Accordingly, the requisite positions are formed by the rigid resin moldings, a group of electric wires can be bent by requisite degrees against the stiffness of the group of electric wires, and made flat.

As a result, deformation of a grommet by the stiffness of a group of electric wires which often occurs in conventional rubber or elastomer grommets is prevented. Additionally, damage to the grommet and the group of electric wires is prevented. Further, the group of electric wires can be fixedly maintained in position.

Further, as the group of electric wires are protected by the grommet in the weather-exposed area of an automobile, the electric wires are thus kept dry.

It is noted that the foregoing examples have been provided merely for the purpose of explanation and are in no way to be construed as limiting of the present invention. While the present invention has been described with reference to certain embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

The present disclosure relates to subject matter contained in Japanese Utility Model Application No. JP 10-137269, filed May 19, 1998, which is expressly incorporated herein by reference in its entirety.

What is claimed is:

1. A grommet constructed and arranged for accepting at least one wire therethrough and for fastening to a vehicle body, comprising:
   a tubular flexible portion having a through-hole for accepting at least one electric wire; and
   a tubular rigid portion having a through-hole for accepting said at least one electric wire, said rigid portion being readily removable and reconnectable to said flexible portion, and said rigid portion through-hole being in communication with said flexible portion through-hole, said rigid portion further having a bent portion;
   at least one hooking part provided on an outer peripheral portion of an end of said tubular rigid portion; and
   at least one hooked part provided on an inner peripheral portion of an end said tubular flexible portion; wherein:
     said at least one hooked part and said at least one hooking part are configured to be sequentially connected to one another;
     at least a portion of said flexible portion and at least a portion of said rigid portion comprise a flat tubular portion; and at least a portion of said flexible portion and at least a portion of said rigid portion comprise a circular tubular portion.

2. The grommet according to claim 1, wherein: said at least one hooking part comprises:
   a first hooking part protruding at an incline from a tip of said end of said tube of said rigid portion; and
   a second hooking part located at a predetermined distance from said first hooking part; said at least one hooked part comprises:
      a first hooked part recessed at a predetermined distance from a tip of said end of said tubular flexible portion;
      a second hooked part recessed at a predetermined distance from said first hooked part; and
      a sealing lip centrally protruding between said first hooked part and said second hooked part; and
   wherein:
      said tubular rigid portion is internally interfiled with said tubular flexible portion;
      said first hooking part is interfitted with said second hooked part;
      said second hooking part is interfitted with said first hooked part; and
      said sealing lip interfits intermediate said first and said second hooking parts.

3. The grommet according to claim 1, further comprising a first mark provided on an outer periphery of each said tubular flexible portion and said tubular rigid portion, said first mark indicating an insertion direction for inserting the at least one wires in the grommet, said mark further indicating an order of assembly of said tubular flexible portion and said tubular rigid portion, thereby enabling the at least one wires to be inserted in accordance with the first mark prior to the connection of said tubular flexible portion and said tubular rigid portion, and further enabling the connection of said at least one wire after insertion thereof.

4. The grommet according to claim 1, further comprising a second mark located at an outer peripheral surface proximate the connection intersection of said flexible portion and said rigid portion, said second mark configured to aid in the circumferential directional alignment of said tubular flexible portion and said tubular rigid portion.

5. The grommet according to claim 1, wherein; said tubular flexible portion comprises:
   a first flexible portion having a first end and a second end, comprising:
      a diameter-expanding tubular part located at said first end;
      a bellows-type tubular part being continuously bent from said diameter-expanding tubular part to said second end; and
      a inner member having a vehicle body hooking part on said diameter-expanding tubular part; and
      wherein a first of said at least one hooked part is provided on an inner peripheral surface of said second end of said first flexible portion;
   a second flexible portion having opposed ends in a flat tubular configuration, wherein a second of said at least one hooked part is provided on an inner peripheral surface of one end of said opposed ends of said second flexible portion, and a third of said at least one hooked part is provided on an inner peripheral surface of another end of said opposed ends of said second flexible portion; and
   a third flexible portion having opposed ends, wherein:
      one end of said opposed ends of said third flexible portion has a fourth of said at least one hooked parts provided on the inner peripheral surface thereof, said one end having a flat tubular cross-section; and
      another end of said opposed ends of said third flexible portion is split into a plurality of hatch hooking parts, each of said plurality of hatch hooking parts having a branched tubular part depending therefrom, each said branched tubular part having a pair of longitudinal slits therein; and
   said tubular rigid portion comprises:
      a first rigid portion having opposed ends, wherein:
         one end of said opposed ends of said first rigid portion comprises said at least a portion of said rigid portion that comprises a circular tubular portion;
         a first of said at least one hooking part is provided on an outer peripheral surface of said one end of said first rigid portion, said first of said at least one hooking part adapted to be connected to said first of said at least one hooked part of said second end of said first flexible portion;
         said opposed ends are at approximately a right angle;
         another said end of said first rigid portion comprises said at least a portion of said rigid portion that comprises a flat tubular portion, said flat tubular portion depending from said circular tubular portion; and
         a second of said at least one hooking part is provided on an outer peripheral surface of said one end of said first rigid portion, said second hooking part adapted to be connected to said second hooked part of said one end of said second flexible portion; and
      a second rigid portion having opposed ends and being bent along its width at a midpoint of its longitudinal direction, said second rigid portion having a generally flat tubular cross section, wherein:
         a third of said at least one hooking part is provided on an outer peripheral surface of one said end of said second rigid portion, said third hooking part adapted to be connected with said third hooked part on said second flexible portion; and
         a fourth of said at least one hooking part is provided on an outer peripheral surface of another said end of said second rigid portion, said fourth hooking part adapted to be connected with said fourth hooked part on said third flexible portion;
   wherein:
      after the insertion of said at least one wire from said third flexible portion, through said second rigid portion, through said second flexible portion, through said first rigid portion and through said first flexible portion, said hooking parts are adapted to be sequentially connected with said hooked parts.

6. The grommet according to claim 5, further comprising:
   a vehicle body hooking part provided on said first flexible portion and adapted to be connected to a through-hole provided on a roof panel of a vehicle; and
   a hatch hooking part provided on a respective said branched tubular part of said third flexible portion adapted to be connected to a through-hole provided on rear door glass of the vehicle;
   said grommet adapted to connect the at least one wire through the rear door glass from the roof of a vehicle, the rear door glass of the vehicle configured to open and close independently from the opening and closing of the rear door of the vehicle.

7. A grommet constructed and arranged for accepting at least one wire therethrough and for fastening to a vehicle body, comprising:

a tubular flexible portion having a through-hole for accepting at least one electric wire; and a tubular rigid portion having a through-hole for accepting said at least one electric wire, said rigid portion being connected to said flexible portion, and said rigid portion through-hole being in communication with said flexible portion through-hole, said rigid portion further having a bent portion; wherein at least a part of said flexible portion and at least a part of said rigid portion comprise a flat tubular portion, thereby facilitating an insertion of the at least one wire through said at least a part of said flexible portion and said at least a part of said rigid portion, and further facilitating the insertion of said at least a part of said flexible portion and said at least a part of said rigid portion in a narrow flat wiring space defined between components of the vehicle body.

* * * * *